INVENTOR
JOSEPH GARDBERG
BY Emery Robinson
ATTORNEY

START-STOP TELEGRAPH SIGNAL GENERATOR WITH TWO OSCILLATORS

Filed Nov. 27, 1956

3 Sheets-Sheet 2

INVENTOR
JOSEPH GARDBERG

BY Emery Robinson
ATTORNEY

START-STOP TELEGRAPH SIGNAL GENERATOR WITH TWO OSCILLATORS

Filed Nov. 27, 1956 3 Sheets-Sheet 3

INVENTOR
JOSEPH GARDBERG

BY Emery Robinson
ATTORNEY

United States Patent Office 2,945,092
Patented July 12, 1960

2,945,092

START-STOP TELEGRAPH SIGNAL GENERATOR WITH TWO OSCILLATORS

Joseph Gardberg, Chicago, Ill., assignor to Teletype Corporation, Chicago, Ill., a corporation of Delaware Filed Nov. 27, 1956, Ser. No. 624,590

9 Claims. (Cl. 178—53.1)

Figure 1:
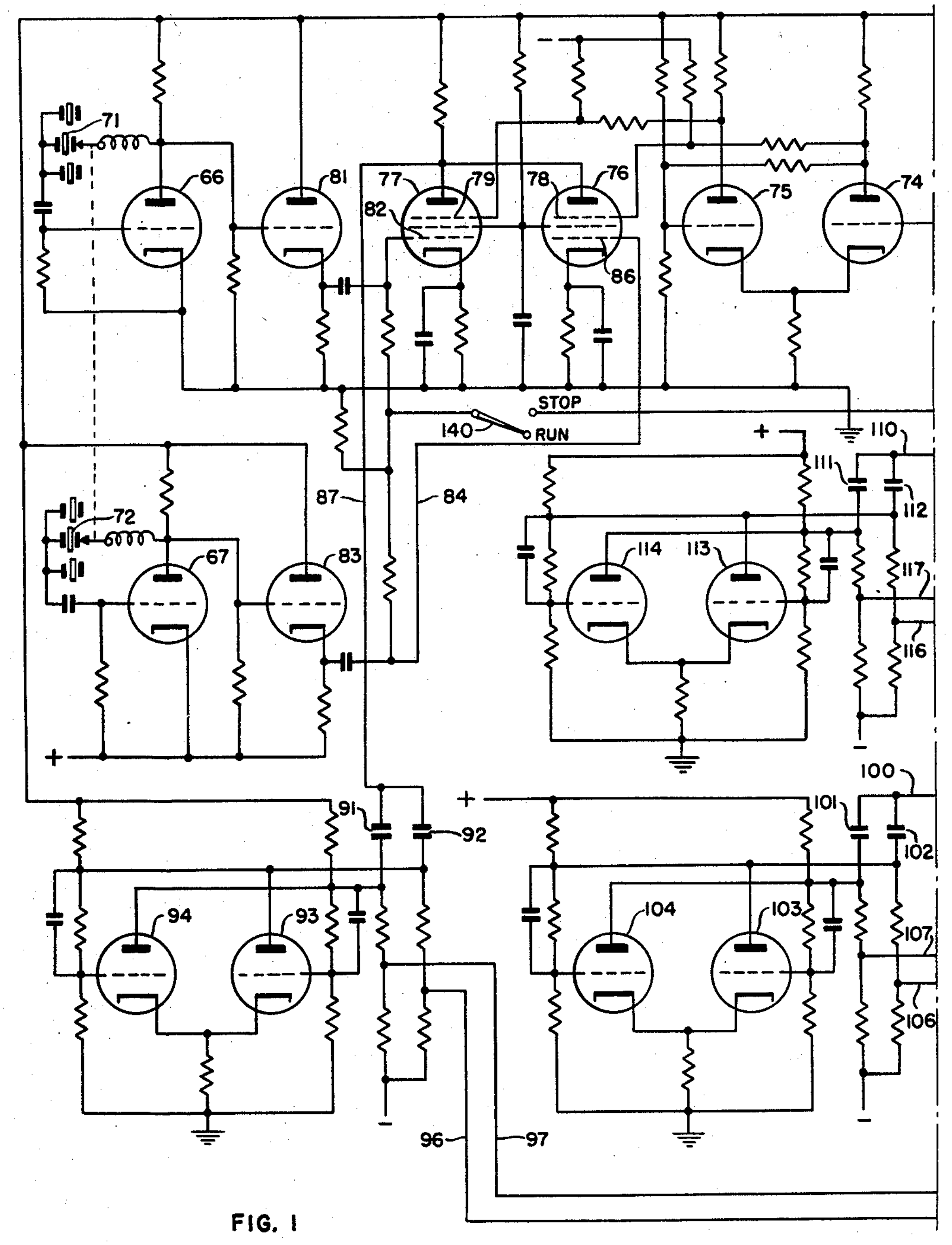

This invention relates to a start-stop signal generator and more particularly to a signal generator driven by a multi-stage distributor which in turn is selectively driven by one or the other of a pair of oscillators.

As greater speeds of telegraph transmission are utilized, it becomes increasingly important that the initially generated, individual signal impulses be as near perfect as possible; otherwise the probability of impulses being lost or further mutilated in transmission is increased. In cases where the signal impulses are seriously mutilated, spurious operation of the various component equipments can be reasonably expected.

In high speed transmission systems, electronic equipment is generally used and where varying transmission speeds are required, it is necessary that the components utilized have very stable characteristics over wide ranges of transmitting speeds. In many communication installations it is expedient to have a single piece of equipment adapted to generate 5, 6 or more unit Baudot code or other code type signals together with facilities for automatically generating stop impulses of various durations.

It is a primary object of this invention to provide a signal generator whose speed of operation is determined solely by the resonant frequency of a primary driving oscillator so that a change in such speed does not require recalibration of further circuitry.

It is another object of the invention to provide a high speed electronic signal generator to produce start-stop signals having a start impulse, a selectively-variable number of intelligence impulses of a first, exact-time duration and a stop pulse of a second, exact-time duration.

It is a further object of the invention to provide a very stable signal generator having facilities for varying the transmitting speed and the number of generated signal impulses.

Still another object of the invention resides in a signal distributor that is selectively driven by a pair of oscillators under the control of the signal distributor.

A still further object of the invention resides in a multi-stage signal distributor which controls a blocking circuit that selectively renders effective a pair of constantly running oscillators to drive the distributor.

With these and other objects in view, a start-stop signal generator embodying the invention may include a distributor, a pair of oscillators for driving the distributor and means causing the oscillators to drive the distributor alternately.

More specifically, the present invention contemplates a source of signal impulses that are successively applied to an output line under the control of a start-stop signal distributor. Facilities are provided so that the number of signal impulses applied to the line may be varied by selectively varying the number of effective stages in the distributor. A pair of crystal-controlled oscillators provide two continuous trains of pulses for driving the distributor. These pulses are not, however, applied directly to the distributor, but rather are applied to switch gates. A gate control circuit connected to the distributor controls the switch gates to permit only one train of pulses at any one time to operate the distributor.

In the normal generation of start-stop telegraph signals it is desired that the stop impulse be 1.42 times the length of the individual start and intelligence impulses. In order that the present invention may generate such a signal, a first one of the pair of crystal-controlled oscillators drives the distributor through a series of frequency dividers so that the start and intelligence impulses are of the desired impulse duration. Parameters are selected for the second oscillator so that the output pulses therefrom are spaced apart 1.42 times the spacing of the pulses coming from the first oscillator. When the stop stage of the distributor is operated, the control circuit actuates the gates whereupon the oscillations from the first oscillator are blocked, and the oscillations from the second oscillator are passed to effectuate the driving of the frequency dividers. A single output pulse from the frequency dividers is applied to advance the distributor to the start stage at a time which is 42% greater than the time at which any of the other stages were advanced. By merely substituting a second crystal in the oscillator having a different frequency rate, the duration of the stop pulse may be readily changed.

Figure 2:
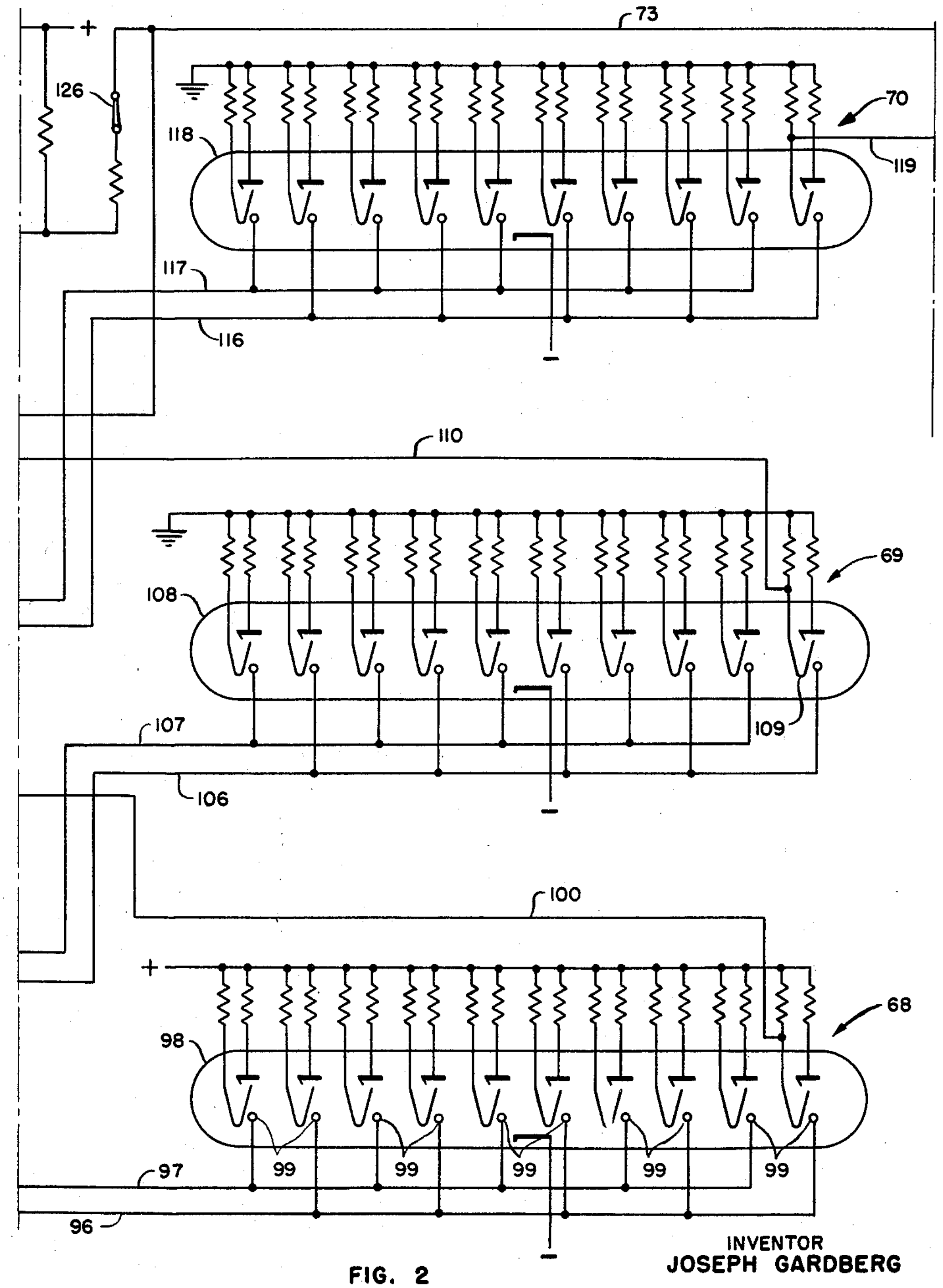
Figures 3, 4:
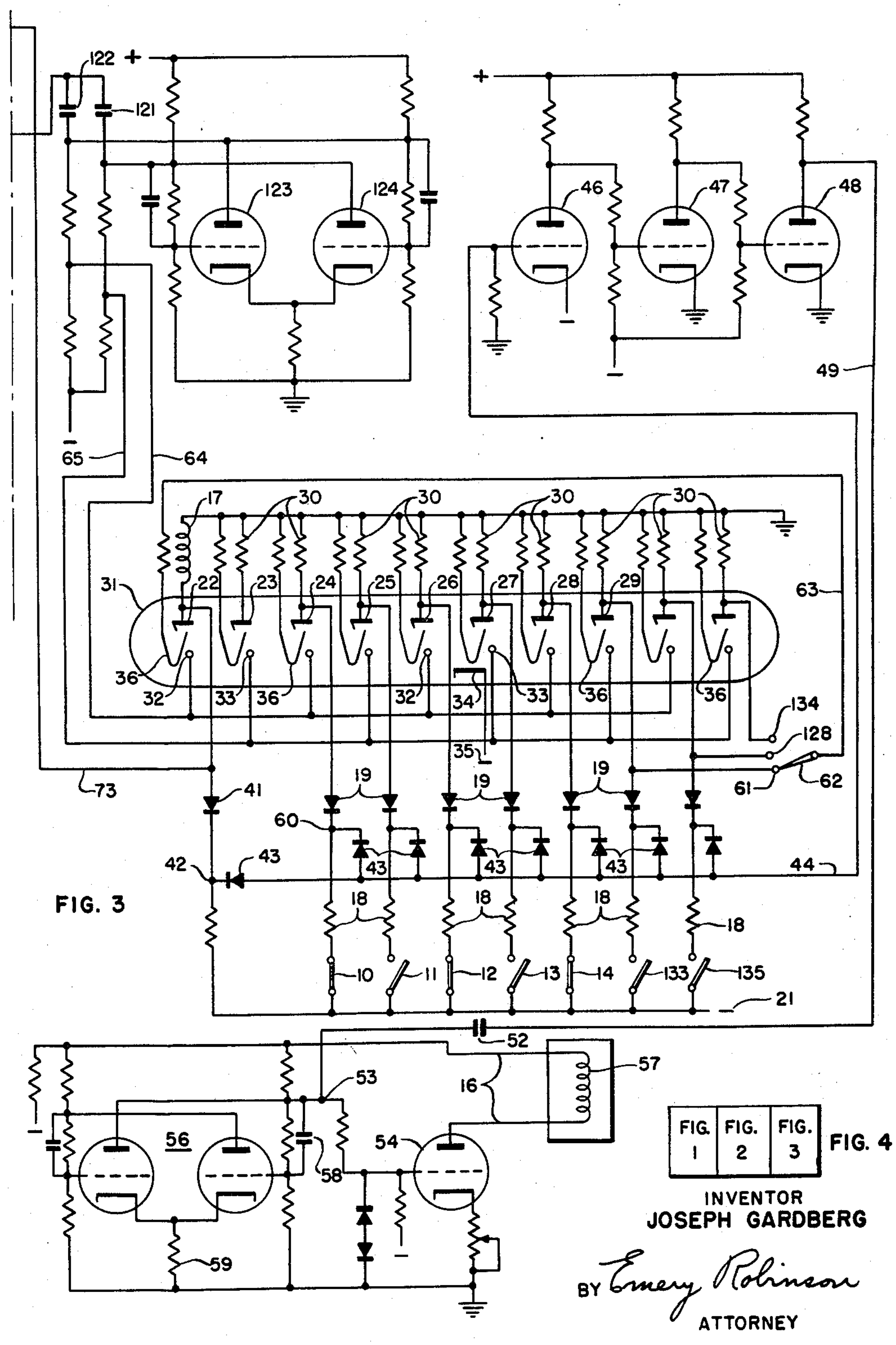

Other objects and advantages of the present invention will be apparent from the following detailed description when considered in conjunction with the accompanying drawings wherein:

Figs. 1, 2 and 3, when assembled in the manner depicted in Fig. 4, illustrate circuits of a start-stop signal generator that is selectively driven by a pair of oscillators in accordance with the principal features of the present invention.

Referring to Fig. 3, there is shown a source of signals which in the present instance is a tape reader of a well-known type. The reader is represented by a set of contacts 10, 11, 12, 13 and 14 that are selectively positioned in accordance with transverse rows of permutatively-arranged perforations formed in a tape. Whenever a perforation is ascertained, the associated contact is closed, and such condition is representative of a marking or current condition to be impressed on an output line 16. In addition, the tape reader is also represented by a feed magnet 17 which functions to control the advance of each new row of perforations to the sensing position following each transmission of a signal. Facilities are provided to energize this magnet during the generation of a stop impulse accompanying each generated signal.

Each of the contacts 10 to 14, inclusive, is connected in a circuit including a resistor 18 and a diode 19. The circuits are connected to a source 21 of negative battery and terminate in connections at a series of targets 22 to 29, inclusive, which are connected through series resistors 30—30 to a common ground potential. The targets are positioned in and form elements of a magnetron-type beam switching tube 31. The tube 31 has two sets of externally-connected control grids 32—32 and 33—33, both of which sets are utilized to effect the successive stepping of a conductive path between a common cathode 34, connected to a source of negative potential 35, and the targets 22 to 29, inclusive. Whenever a conductive path is established between one of the targets and the cathode 34, the lowering of the potential of an associated grid disturbs the electric field and results in a transfer of the conductive path to the next succeeding target. The conductive path will be "locked" to a target by an associated one of a group of spades 36—36 until such time as the potential of the succeeding grid 32 or 33 is lowered to effectuate another switching operation.

For the purpose of illustrating the operation of the signal generator embodying the invention, assume that the contacts 10 to 14, inclusive, are positioned to generate a signal representing the letter "Y." Thus, in accordance with the five-unit Baudot code, the first, third and fifth impulses will be marking, and the second and fourth impulses will be spacing. Consequently, contacts 10, 12 and 14 will be closed, and contacts 11 and 13 will be open. Assume also that the conductive beam has just been established between the cathode 34 and the left-hand target 22. The establishing of the beam results in a drop in the potential of the target 22 due to the target current now flowing through the feed magnet 17. The section of the tube 31 now conducting represents the stage which controls the generation of the stop impulse.

Prior to the operation of the stop stage, a circuit was established from ground potential, through the feed magnet 17, a diode 41 and a junction point 42 to the source 21 of negative battery. With the resistors 18—18 designed to be approximately 100 times larger than the resistors 30—30, the junction point 42 will be, at this time, essentially at ground potential. As mentioned hereinabove, when the conductive beam is established between the cathode 34 and the target 22, the target potential drops, and the circuit parameters are chosen such that a potential is developed on the target 22 that is more negative than the negaive source 21. This results in the diode 41 stopping conduction. When the diode 41 stops conducting, the potential at the junction point 42 drops towards that of the negaive source 21.

A diode 43 is so connected that this drop is potential starts it conducting and is reflected therethrough to a lead 44, which is connected to the grid of a normally-conducting buffer amplifier 46. The drop in potential in the grid circuit manifests itself in rendering the tube 46 nonconductive, whereupon the anode potential of the tube 46 rises to impress an increased voltage on the grid of a tube 47. Conduction of this tube follows and is accompanied by a drop in its anode potential which effectuates a turning off of a conducting, phase inverter tube 48. The anode potential of tube 48 thereupon increases and this increase is impressed over a lead 49 and through a differentiating capacitor 52, which causes a differentiated, positive pulse to be applied to a junction point 53.

Appearance of a positive voltage pulse at the junction point 53 performs two functions; namely, the rendering of a tube 54 conductive and the energizing of a binary flip-flop circuit 56. Upon tube 54 assuming a conductive condition, a circuit is completed through the tube and over the output line 16 to a selector coil 57 of a distant, receiving telegraph apparatus. The increased potential at the junction point 53 is impressed through a capacitor 58 and on the grid of the right-hand triode of the flip-flop circuit 56, thereby placing this triode in a conducting condition. Upon the right-hand triode assuming a conducting condition, the left-hand triode of the flip-flop circuit 56 is driven into a nonconducting condition due to the common cathode resistor 59 coupling and the common plate-grid coupling between the tubes. Assumption of a nonconductive condition by the left-hand triode results in a rise in anode potential which is impressed through the junction point 53 to the grid of the tube 54, thereby maintaining this tube in a conducting condition and, hence, maintaining a marking pulse on the output line 16.

When the stop stage of the tube 31 is shut off and the next succeeding stage (start signal impulse stage) is rendered conducting, there is no longer a connection running from a conducting target to the lead 44, and as a result, the potential on the junction point 42 increases towards its former value. It is to be recalled that this value, ground potential, was less negative than when the stop stage was conducting. As a consequence, the increased potential on the lead 44 drives the tube 46 into a state of heavy conduction. Immediately thereafter, the tube 47 is rendered nonconductive and tube 48 is rendered conductive. The resulting drop in anode potential of the tube 48 is impressed over the lead 49 to the differentiating capacitor 52, whereupon a negative voltage spike is passed to the junction point 53. The appearance of this negative-going voltage spike turns the tube 54 off to impress a no-current or spacing condition on the lead 16 running to the distant receiving apparatus. Appearance of the negative voltage spike at the junction point 53 also renders nonconductive the right-hand tube of the flip-flop circuit 56. Immediately thereupon, the left-hand triode of the flip-flop circuit 56 is placed in a conductive state to impress a decreased potential condition on the grid of the tube 54, to hold this tube in a nonconductive condition.

When the next (number 1 signal impulse stage) of the distributor operates, the target 24 is connected through the associated diode 19 and through the closed contact 10, to the source of negative battery 21. Consequently, before operation of this stage, the potential of a junction point 60 was essentially ground potential. When this stage conducts, the potential of the junction point 60 immediately drops, and as a result, the potential on the lead 44 also drops since the associated diode 43 now assumes conduction and reflects the potential drop therethrough. Again, as when the stop stage of the distributor tube 31 operated, the tube 46 is rendered nonconducting, the tube 47 conducting and the tube 48 nonconducting. The resultant rise in anode potential of the tube 48 is impressed over the lead 49 to again operate the tube 54 to impress a current or marking condition to the output line 16. Appearance of the increased potential over the lead 49 also again energizes the flip-flop circuit 56 to maintain the steady marking condition on the line 16 during the entire period that the number 1 signal impulse stage of the distributor 31 is operated.

When the next stage (number 2 signal impulse stage) of the distributor operates, the contactor 11 associated with the target 25 is open and as a consequence the potential on lead 44 assumes that of the ground potential as no path to negative battery 21 is completed. Inasmuch as this potential is higher than the potentials previously established on the lead 44, tube 46 is caused to conduct. As a result, tube 47 is shut off and tube 48 is rendered operative to impress a negative going potential over the lead 49. Appearance of the negative going potential over the lead 49 will again render the tube 54 nonconductive to impress a no-current or spacing impulse on the lead 16. Obviously, the negative pulse effectuates a resetting of the flip-flop circuit 56 to hold the tube 54 in an unoperated or spacing condition during the entire period that the number 2 signal impulse stage of the distributor tube 31 is operating.

As the stages of the tube 31 are successively rendered conductive, signal conditions representative of the setting of the remaining contacts 12, 13 and 14 are impressed on the output line 16. Due to the connection running from the target 29 of the number 6 signal impulse stage through a contact 61 of a switch 62 and over a lead 63 to the spade 36 in the stop impulse stage, the advance of the conductive stage in the distributor instantaneously switches from the number 6 impulse stage to the stop impulse stage. Upon operation of the stop stage in the distributor, the magnet 17 is energized to advance a new row of perforations into position to control the contacts 10 to 14, inclusive.

The stepping of the distributor 31 is accomplished by applying negative potentials over leads 64 and 65. The origins of these negative pulses are in a pair of oscillators 66 and 67, that are selectively rendered effective to apply stepping pulses through a series of frequency dividers 68, 69 and 70 to the leads 64 and 65, as will now be explained. The oscillator 66 includes a crystal 71 in its feedback circuit which establishes the frequency of the output oscillations. These output oscillations eventually, after division, drive the distributor tube 31 at a predetermined signal impulse frequency. Two other crystals are shown that may be selectively incorporated in the feedback circuit to vary the frequency of the output oscillations and hence vary the speed at which the distributor tube 31 is driven.

The oscillator 67 also has a crystal 72 in its feedback circuit. The crystal 72, however, possesses characteristics which provide output oscillations from the oscillator 67 that are at a lower frequency than those from the oscillator 66. More particularly, for the generation of commercial start-stop signals, a crystal 72 is selected so that the outputs of the oscillator 67 are spaced 42% further apart than the outputs from the oscillator 66. Other crystals may be connected selectively in this feedback circuit to vary the period of this oscillator and hence vary the duration of stop impulse generated with each signal. The output pulses from the oscillator 67 are only utilized to drive the distributor tube 31 through the stop stage and thus control the duration of the stop impulse. Inasmuch as there is a 42% greater spacing of these output pulses, the generated stop pulse will be of 42% greater duration.

Facilities are provided so that only one of the oscillators 66 or 67 is effective at any one time to drive the distributor tube 31. When, in a course of transmission, the left-hand stop stage of the distributor tube 31 is rendered operative, the accompanying drop in target potential thereof is impressed over a lead 73 to place a triode 74 in a nonconductive state. The triode 74 and a triode 75 are interconnected as a bi-stable multivibrator that is cathode coupled to provide a push-pull relationship between the conductive states of the two triodes. More specifically, the rendering of the right-hand triode 74 nonconductive is accompanied by the rendering of the left-hand triode 75 conductive. The triodes 74 and 75 form a gate control circuit for a pair of pentodes 76 and 77 that function to gate the output pulses from the oscillators 66 and 67, respectively. When the triode 74 is rendered nonconductive, the accompanying rise in anode potential is applied to condition a suppressor grid 78 of the pentode 76. At the same time, the drop in anode potential of the conductive triode 75 is impressed on a suppressor grid 79 of the pentode 77, thereby holding this pentode in a nonconductive state.

It will be noted that the output of the oscillator 66 is impressed on the control grid of a buffer amplifier 81. An output is taken from the cathode circuit of the amplifier 81 and is impressed on a control grid 82 of the pentode 77, but since this pentode has a reduced potential applied to its suppressor grid 79, the variations in potential applied to the control grid 82 are ineffective to change the nonconductive state of the pentode. The output from the oscillator 67 is impressed on the control grid of a buffer amplifier 83, and an output is taken from the cathode circuit thereof and applied over a lead 84 to a control grid 86 of the pentode 76. Inasmuch as the suppressor grid 78 is primed by an increased potential condition, the pentode will respond to changes of the voltage applied to the control grid 86.

It will be noted that the anodes of the pentodes 76 and 77 are connected to a common output lead 87; hence, as either pentode varies in conductivity, there will be a like varying potential impressed over the lead 87. Recapitulating briefly, the output from the oscillator 67 is impressed on the control grid of the tube 83 and then over the lead 84 to vary the conductivity of the pentode 76. A varying output is thus obtained at the anode of this pentode which is passed over the lead 87 to a pair of differentiating capacitors 91 and 92 that are connected, respectively, to a binary flip-flop circuit, including tubes 93 and 94.

Assuming that the right-hand tube 93 is conducting, then the appearance of a negative pulse on its grid places this tube in a nonconductive condition which is immediately followed by the conduction of the tube 94. The anodes of the tubes 93 and 94 are connected through voltage dividers to a source of negative voltage. Depending upon which of the tubes 93 or 94 is conducting, a negative voltage is applied to either a lead 96 or a lead 97. The leads 96 and 97 are connected to alternate control grids of a magnetron type beam switching tube 98. The tube 98 is quite similar to the previously described distributor tube 31 and, similarly thereto, the conductive stage of the tube 98 may be switched to a succeeding stage by applying a negative potential to a control grid 99 associated with the conductive stage. The tube 98 has ten stages and, as mentioned hereinbefore, is utilized as a frequency divider. The appearance of the first negative going pulse on the lead 97 effectuates a stepping of the conductive stage which in turn is extinguished upon the appearance of the next negative going pulse over the lead 96.

The stages of tube 98 will be operated successively and upon operation of the extreme right-hand stage, the accompanying drop in spade potential is impressed over a lead 100 to a pair of differentiating capacitors 101 and 102. These capacitors are connected to another pulse drive circuit consisting of tubes 103 and 104 interconnected to form a binary flip-flop circuit. Negative going outputs are derived from a source of negative voltage connected to the anodes of the tubes 103 and 104 and through voltage dividers and are impressed, respectively, over leads 106 and 107 running to a series of control grids of another magnetron beam switching tube 108. This tube also has ten stages and forms the frequency divider 69. It will be noted that the last right-hand spade 109 has a lead 110 attached thereto for transferring negative output pulses. The output pulses applied over the lead 110 are impressed on a pair of capacitors 111 and 112 which produce negative voltage pulses to operate a drive pulse generator consisting of tubes 113 and 114, connected together to form a binary flip-flop circuit identical to circuits 103—104 and 93—94.

Negative output voltages from the pulse generator 113—114 are applied alternately and respectively, over a pair of leads 116 and 117 to step the frequency divider 70 consisting of a magnetron type beam switching tube 118. When the last stage of this frequency divider tube is operated, the accompanying drop in spade potential is impressed over a lead 119 to a pair of differentiating capacitors 121 and 122. The differentiated negative pulses are effective to change the operative condition of another pulse generator comprising tubes 123 and 124 connected together to form a binary flip-flop circuit. The resultant drops in anode potential of the tubes 123 and 124 are applied over the leads 64 and 65, respectively, to drive the signal distributor tube 31. By lowering the potential on the grid 32 of the conducting, left-hand stop stage of the distributor, the tube 31 is stepped so that the next-succeeding start stage is operated.

When the left-hand stop stage of the distributor tube 31 is cut off, the accompanying rise in target potential is impressed over the lead 73 to place the triode 74 in a conductive condition. As a result thereof the triode 75 is cut off and the accompanying rise in anode potential is impressed on the suppressor grid 79 of the switch gate pentode 77 to condition this pentode to respond to the output pulses coming from the oscillator 66. Simultaneously, the accompanying drop in anode potential of the triode 74 is applied to the suppressor grid 78 of the pentode 76 to hold the pentode from responding to the output pulses coming from the oscillator 67. With this arrangement of conditioning potentials, the pentode 77 is now effective to apply output pulses over the lead 87, which pulses are effective to drive the frequency divider tubes 98, 108 and 118 at a rate determined by the oscillator 66. The output from the frequency divider tube 118 is effective to step the signal distributor tube 31 successively through the start stage and the Nos. 1, 2, 3, 4 and 5 signal impulse stages to control the generation of the start impulses and the five intelligence impulses. When the stop stage of the tube 31 is again operated, the target potential thereof decreases, and this decreased potential is applied to the lead 73. Consequently, the triode 74 is cut off and the triode 75 starts to conduct. As described hereinbefore, the pentode 77 is cut off and the pentode 76 is now conditioned to permit the oscillator 67 to control the drive of the frequency dividers 98, 108 and 118. The output from the divider 118 is now such that the stop stage is held conductive for a period of time which is 42% greater than the time the other stages are operative.

It is possible with the present invention to generate signals wherein the stop impulses are of equal duration to the duration of the other impulses. This is accomplished by merely opening a switch 126, whereupon the gate control circuit including the tubes 74 and 75 is then set by the grid bias on the tube 74 so that the triode 75 is nonconducting and the triode 74 is conducting. With such an arrangement, the oscillator 67 is rendered ineffective and the oscillator 66 is effective to drive the signal distributor tube 31 not only through the start and signal impulse stages, but also through the stop stage.

The disclosed signal generator is also capable of generating signals having six or seven intelligence impulses. The six impulse feature is accomplished simply by moving the switch 62 from the contact 61 to a contact designated by the reference numeral 128. Now, during the generation of each signal, the distributor will step through the start stage and six intelligence stages plus the stop stage. An added contact 133 can then be included in the circuit depending on its positioning in accordance with the condition of the message tape. Signals having seven intelligence impulses may be generated by moving the switch 62 to a contact 134, whereupon a tenth stage of the distributor tube is rendered effective, and start-stop signals having seven intelligence impulses may be generated by use of the contacts 10 to 14, inclusive, the contact 133 and a contact 135 which is now in the circuit.

In order to stop the signal generator, a "stop-run" switch 140 (Fig. 1) is provided. When this switch is closed by moving it to the "stop" position and the distributor tube 31 is stepped to render the stop stage conductive, the drop in target potential is applied over the lead 73 and through the now-closed switch 140 to the control grids of both pentodes 76 and 77, thereby holding them from responding to the outputs of the oscillators 66 and 67. When the switch 140 is again placed in the "run" position, the conductive path in the distributor tube 31 is on the spade of the stop stage; consequently, the first signal generated will be a complete start-stop signal, assuring that resumption of transmission will not occur in the middle of a character.

It is to be understood that the above-described arrangement and construction of elements are simply illustrative of the invention and many other modifications may be made without departing from the invention.

What is claimed is:

1. A start-stop signal impulse generator which comprises a multi-stage distributor, means for conditioning each of the distributor stages for operation in accordance with one of the signal impulses to be generated, an output circuit, means for applying an output of the conditioning means to the output circuit each time a distributor stage is operated, a plurality of oscillators of different frequency for operating the distributor stages successively, and gating means connected to one of the distributor stages for causing one of the oscillators to operate that stage during the generation of the impulse associated therewith.

2. A start-stop signal impulse generator which comprises an electronic multi-stage distributor having a stage for a start impulse, each of a plurality of intelligence impulses and a stop impulse, a pair of oscillators for energizing the distributor stages by rendering them conductive successively, and electronic gating means permitting one of the oscillators to energize the distributor through the stages associated with the start and the intelligence impulses and permitting the second of the oscillators to energize the distributor through the stage associated with the stop impulse.

3. An apparatus for impressing the outputs of a multi-wire source of telegraph intelligence signals on a single transmission line, which comprises a multi-stage electronic distributor, means for connecting each of the intelligence signals to a corresponding one of the distributor stages, means connected to two other distributor stages for obtaining therefrom start and stop signals in timed sequence with the intelligence signals, a pair of continuously-operating oscillators of different frequency for rendering the distributor stages conductive successively at exclusive intervals, and a gating circuit permitting one of the oscillators to operate the distributor during the start and intelligence signals and permitting the second of the oscillators to operate the distributor during the stop signal.

4. An apparatus for impressing conditioning signals and the outputs of a multi-wire source of telegraph signals on a single transmission line, which comprises a multi-wire electronic distributor, each of the distributor stages associated with one of the conditioning or intelligence signals, two continuously-running oscillators of different frequencies for rendering the distributor stages conductive successively at exclusive intervals, gating means connected between the oscillators and the distributor permitting one of the oscillators to render the distributor stages associated with a predetermined one of the conditioning signals and the intelligence signals conductive, and means connected between the distributor stage associated with another of the conditioning signals and the gating means for permitting the second oscillator to render that stage of the distributor conductive during the impression of the other conditioning signal on the transmission line.

5. A signal generator for impressing the outputs of a multi-wire source of telegraph intelligence signal impulses on a single transmission line, which comprises a multi-stage electronic distributor, means for conditioning each of the distributor stages with one impulse of a group including start, intelligence and stop impulses, means for applying an output of the conditioning means to the transmission line upon operation of the conditioned distributor stages, a plurality of oscillator means of different frequency for operating the distributor stages successively, and gating means connected to the distributor stage associated with the stop impulse for permitting one of the oscillator means to operate the distributor during the impression of the stop impulse over the transmission line and for permitting another of the oscillator means to operate the distributor during the impression of the start and intelligence impulses over the transmission line.

6. An apparatus for connecting signals from a multi-wire source of telegraph intelligence signals to a single transmission line, which comprises a plurality of sensing means, each of the sensing means connected to an associated one of the multi-wire signal sources, means for conditioning the sensing means with marking and spacing potentials indicative of the signals to be transmitted, a multi-stage distributor having a stage connected to an associated one of each of the sensing means with two stages so connected to the sensing means that the sensing means is conditioned with potentials indicative of stop and start signals, an output circuit connected to the transmission line, means for applying the output from the sensing means to the output circuit, a pair of continuously-running oscillators of different frequency for operating the distributor stages successively such that start, intelligence and stop signals are impressed on the transmission line successively, a gating circuit including two pentode vacuum tubes, means connecting the distributor stage associated with the stop impulse to the suppressor grids of the pentodes such that one of the pentodes is conditioned to potential variations impressed on its control grid during the transmission of the stop signal and the other is conditioned similarly during the transmission of the remaining signals, and means for applying each of the oscillator outputs to an associated one of the pentode control grids.

7. A start-stop signal generator which comprises a distributor, a plurality of oscillators of different frequency for driving the distributor, and means for causing one of the oscillators to drive the distributor for a predetermined invariable portion of its operating cycle and for causing another of the oscillators to drive the distributor for the remainder of its operating cycle.

8. A start-stop signal generator which comprises a multi-stage distributor, a plurality of oscillators of different frequency for rendering the distributor stages conductive successively, and gating means for causing one of the oscillators to render a predetermined and invariable number of the stages conductive and for causing another of the oscillators to render the remainder of the stages conductive.

9. A signal generator for generating signals including start, intelligence and stop impulses, which comprises a signal distributor having a plurality of stages each of which is associated with an impulse in each signal to be generated, a pair of oscillators for operating the distributor stages successively, a first of the oscillators having a first predetermined frequency and the second having a second predetermined frequency such that the period of the second oscillator is 42% longer than the period of the first oscillator, and gating means for causing the first oscillator to operate the distributor stages associated with the start and intelligence impulses and for causing the second oscillator to operate the distributor stages associated with the stop impulse.

References Cited in the file of this patent

UNITED STATES PATENTS

| | | |
|---|---|---|
| 2,379,415 | Charbonneaux | July 3, 1945 |
| 2,568,336 | Houghton | Sept. 18, 1951 |
| 2,649,580 | Dunn | Aug. 18, 1953 |
| 2,757,237 | Goldman | July 31, 1956 |
| 2,787,657 | Terry et al. | Apr. 2, 1957 |

FOREIGN PATENTS

| | | |
|---|---|---|
| 150,601 | Australia | Mar. 24, 1953 |
| 959,104 | France | Mar. 22, 1950 |

OTHER REFERENCES

Western Union Technical Review, vol. 10, issue 1, January 1956, pages 20–26.